United States Patent
Wakahara (10) Patent No.: US 9,857,250 B2
(45) Date of Patent: Jan. 2, 2018

(54) STRAIN SENSOR AND METHOD FOR INSTALLING STRAIN SENSOR

(71) Applicant: CMIWS CO., LTD., Kyoto (JP)

(72) Inventor: Masahito Wakahara, Kyoto (JP)

(73) Assignee: CMIWS CO., LTD., Kyoto (JP)

( * ) Notice: Subject to any disclaimer, the term of this patent is extended or adjusted under 35 U.S.C. 154(b) by 0 days.

(21) Appl. No.: 14/890,351

(22) PCT Filed: Nov. 27, 2014

(86) PCT No.: PCT/JP2014/081446
§ 371 (c)(1),
(2) Date: Nov. 10, 2015

(87) PCT Pub. No.: WO2015/098425
PCT Pub. Date: Jul. 2, 2015

(65) Prior Publication Data
US 2016/0299017 A1 Oct. 13, 2016

(30) Foreign Application Priority Data

Dec. 27, 2013 (JP) ................................. 2013-271577

(51) Int. Cl.
*G01L 1/24* (2006.01)
*G01B 11/16* (2006.01)
(Continued)

(52) U.S. Cl.
CPC .............. *G01L 1/246* (2013.01); *G01B 11/18* (2013.01); *G01B 11/16* (2013.01); *G01B 11/165* (2013.01);
(Continued)

(58) Field of Classification Search
CPC ........... G01L 1/246; G01L 1/242; G01L 1/26; G02B 6/022; G02B 6/02209;
(Continued)

(56) References Cited

U.S. PATENT DOCUMENTS 4,972,073 A 11/1990 Lessing
5,812,251 A * 9/1998 Manesh ................. G01B 11/16
356/32

(Continued)

FOREIGN PATENT DOCUMENTS

DE 102011083028 A1 * 3/2013 ............. G01B 11/18
JP 2000-193413 A 7/2000
(Continued)

OTHER PUBLICATIONS

The extended European search report issued by the European Patent Office dated Apr. 29, 2016, which corresponds to European Patent Application No. 14875857.6-1568 and is related to U.S. Appl. No. 14/890,351.

(Continued)

*Primary Examiner* — Jonathan Dunlap
(74) *Attorney, Agent, or Firm* — Studebaker & Brackett PC (57) ABSTRACT

In a strain sensor and a method for installing a strain sensor according to the present invention, a first base fixes and supports one side of an optical fiber. A second base fixes and supports another side of the optical fiber. A connecting member is constituted of a separate member from the first base and the second base and is detachably mounted between the first base and the second base. Tension is applied to the optical fiber in a state in which the connecting member is mounted between the first base and the second base, and the optical fiber is fixed to and supported by the first base and the second base in a state in which tension is applied.

14 Claims, 4 Drawing Sheets

(51) Int. Cl.
| | |
|---|---|
| *G02B 6/36* | (2006.01) |
| *G01L 1/26* | (2006.01) |
| *G02B 6/02* | (2006.01) |
| *G02B 6/44* | (2006.01) |
| *G01D 5/353* | (2006.01) |

(52) U.S. Cl.
CPC .......... *G01D 5/35316* (2013.01); *G01L 1/242* (2013.01); *G01L 1/26* (2013.01); *G02B 6/022* (2013.01); *G02B 6/02209* (2013.01); *G02B 6/3608* (2013.01); *G02B 6/3628* (2013.01); *G02B 6/3636* (2013.01); *G02B 6/4477* (2013.01)

(58) Field of Classification Search
CPC .. G02B 6/3608; G02B 6/3628; G02B 6/3636; G02B 6/4477; G01B 11/16; G01B 11/165
USPC .............. 73/800, 775; 385/37, 13, 137, 136
See application file for complete search history.

(56) References Cited

U.S. PATENT DOCUMENTS

| | | | | |
|---|---|---|---|---|
| 5,896,191 | A * | 4/1999 | Beier ..................... | G01B 21/32 250/227.16 |
| 5,926,599 | A * | 7/1999 | Bookbinder .............. | C03C 8/14 385/137 |
| 6,122,430 | A * | 9/2000 | Bookbinder .............. | C03C 8/14 385/137 |
| 6,349,165 | B1 * | 2/2002 | Lock .................... | G02B 6/0218 385/127 |
| 6,519,388 | B1 * | 2/2003 | Fernald .................. | G02B 6/022 385/123 |
| 7,068,869 | B1 * | 6/2006 | Araujo .................... | G01L 1/246 385/13 |
| 7,134,219 | B2 * | 11/2006 | Wood ................. | G01D 5/35303 33/613 |
| 7,379,632 | B1 * | 5/2008 | Twerdochlib .......... | G01B 11/18 385/13 |
| 7,796,844 | B2 * | 9/2010 | Tam ................... | G01D 5/35303 385/13 |
| 7,856,888 | B2 * | 12/2010 | Ferguson .............. | G01B 11/18 385/13 |
| 8,282,276 | B2 * | 10/2012 | Tam ................... | G01D 5/35303 374/161 |
| 8,297,129 | B2 * | 10/2012 | Muskopf ................. | G01L 1/242 73/766 |
| 8,701,500 | B2 * | 4/2014 | Swinehart .......... | G02B 6/02209 73/800 |
| 8,792,753 | B2 * | 7/2014 | Ruggiero ................ | G01L 1/246 285/37 |
| 9,081,165 | B2 * | 7/2015 | Swinehart .......... | G02B 6/02209 285/13 |
| 2006/0153490 | A1 * | 7/2006 | Araujo .................... | G01L 1/246 385/13 |
| 2006/0285813 | A1 * | 12/2006 | Ferguson ............... | G01B 11/16 385/138 |
| 2007/0193362 | A1 | 8/2007 | Ferguson | |
| 2007/0293864 | A1 * | 12/2007 | Reimels ............. | A61B 17/8004 606/291 |
| 2009/0126501 | A1 * | 5/2009 | Ferguson ................ | G01B 11/18 73/800 |
| 2010/0021106 | A1 * | 1/2010 | Tam ................... | G01D 5/35303 385/13 |
| 2011/0188537 | A1 * | 8/2011 | Tam ................... | G01D 5/35303 374/161 |

FOREIGN PATENT DOCUMENTS

| | | |
|---|---|---|
| JP | 2002-286563 A | 10/2002 |
| JP | 2005-127744 A | 5/2005 |
| JP | 2007-212460 A | 8/2007 |
| JP | 2008-134155 A | 6/2008 |
| JP | 2008-224635 A | 9/2008 |
| JP | 2011-080923 A | 4/2011 |
| KR | 10-1344722 B1 | 12/2013 |

OTHER PUBLICATIONS

Notification Concerning Transmittal of International Preliminary Report on Patentability (Chapter I) and Translation of Written Opinion of the International Searching Authority; PCT/JP2014/081446 dated Jul. 7, 2016.
International Search Report; PCT/JP2014/081446; dated Mar. 3, 2015.
Written Opinion of the International Searching Authority; PCT/JP2014/081446; dated Mar. 3, 2015.

* cited by examiner

STRAIN SENSOR AND METHOD FOR INSTALLING STRAIN SENSOR

TECHNICAL FIELD

The present invention relates to a strain sensor and a method for installing a strain sensor, and in particular to a strain sensor provided with an optical fiber optically detecting strain in a structure to be measured and a method for installing such a strain sensor.

BACKGROUND ART

Conventionally, strain sensors have been extensively used for structures like buildings, bridges, and tunnels, means of transportation like aircrafts, ships and trains, detecting distortions and displacement of the ground. A strain sensor provided with a resistor has been known. The strain sensor of this kind obtains strain amount based on changes of electric resistance of the resistor caused by deformation. When strain is measured at many points, as an object area to be measured extends a wide area, many strain sensors are arranged on a surface of a measuring object and changes of the electric resistance of each of the sensors are measured. In this case, in each of the strain sensors wires are installed so as to measure the electric resistance and electrical power is needed to be supplied through the wire.

According to the above-described electric strain sensor, very little changes of the electric resistance must be detected and a countermeasure against electric noise is required in order to secure measurement accuracy. Further, a life of the electric strain sensor is short due to aging of the resistor, the wire and contacts thereof and there is a risk of damages by lighting.

Accordingly, a strain sensor provided with an optical fiber has been used in recent years (for example, refer to patent documents 1, 2 and the like). The strain sensor of this kind obtains strain amount on the basis of changes of reflected light and scattering light which are transmitted through the optical fiber in response to deformations of the optical fiber. Such a strain sensor does not need a supply of the electrical power and results of measurement by the strain sensor are less affected by the electric noise. Further, such a strain sensor is less aged and is less damaged by lighting since there is no need for wiring in each of the strain sensors. Therefore, it is characterized that the strain sensor has superior long-term reliability. In addition, the optical fiber itself serves as both a sensor and a signal transmission line so that signals can be transmitted over long distance. Thus, strain of an object over several kilometers can be measured by connecting a measurement instrument at one end of the optical fiber.

For example, in the patent documents 1 and 2 as shown below, a strain sensor (a strain gage) measuring strain amount in an axis direction of an optical fiber linearly arranged on a carrier is disclosed.

The patent document 1 discloses a strain sensor on which an optical fiber having a FBG (fiber Bragg grating) provided in a gage carrier having a support bar which is elastic in an axis direction of the optical fiber is mounted. The support bar is constituted of a groove or a cavity formed in a perpendicular direction to a longitudinal direction.

The patent document 2 similarly discloses a strain sensor on which an optical fiber having a FBG in a gage carrier having a narrow part which is stretchable (elastic) in an axis direction of the optical fiber is mounted. The narrow part is thinner than other parts of the gage carrier and the FBG of the optical fiber is arranged in the narrow part.

CITATION LIST

Patent Documents

Patent document 1: Japanese Unexamined Patent Application Publication No. 2007-212460
Patent document 2: Japanese Unexamined Patent Application Publication No. 2008-134155

SUMMARY OF INVENTION

Problems to be Solved by Invention

According to the art disclosed in the patent documents 1 and 2, the gage carrier is elastic in the axis direction of the optical fiber so that strain in a tensile direction and a compressive direction of the axis direction of the optical fiber occurred on a surface of the measuring object can be excellently transmitted to the FBG.

A range of which such action can be attained, however, is limited to a range of which the support bar or the narrow part can follow. Namely, when a large strain exceeding deformation limit of the elastic part (permissible strain amount) is generated, stress is concentrated in a part of the gage carrier (the support bar or the narrow part) so that it becomes difficult to accurately transmit the strain to the FBG.

For example, in the gage carriers as disclosed in the patent documents 1 and 2, excellently transmittable permissive strain amount is almost 2500 micro-strain. On the contrary, the optical fiber is easy to be deformed since a constitution thereof is quartz glass and the like and the permissive strain amount thereof is almost 20000 micro-strain. Thus, it can be understood that the gage carrier restricts a range of measurable strain.

Further, according to structures of the strain sensors disclosed in the patent documents 1 and 2, when a measuring object is a thin metal plate and the like, strain of the measuring object cannot be accurately measured. This is because the gage carrier has rigidity higher than the measuring object. Namely, the conventional strain sensors disclosed in the patent documents 1 and 2 automatically restrict structures of the measuring object in which the strain sensor enables to accurately measure the strain.

The present invention is attempted in view of such conventional art and the purpose of the present invention is to provide a strain sensor capable of expanding a range of the measurable strain amount more than the conventional art and capable of accurately measuring the strain of the measuring object even having low-rigidity and a method for installing such a strain sensor.

Solution to Problem

The present invention employs following technical means in order to attain the above-described purposes. Firstly, a strain sensor of the present invention has an optical fiber as a premise. The strain sensor according to the present invention is provided with a first base, a second base and a connecting member. The first base fixes and supports one side of the optical fiber. The second base fixes and supports another side of the optical fiber. The connecting member is detachably mounted between the first base and the second base. The connecting member is constituted of a separate member from the first base and the second base. Tension is applied in the state in which the optical fiber is mounted between the first base and the second base, and the optical fiber is fixed to and supported by the first base and the second base respectively in the state in which the tension is applied.

According to the strain sensor of the present invention, the connecting member is detached after the strain sensor is fixed to a measuring object, thereby each of the bases is independent respectively and is not affected by another base. Thus, concentration of stress in particular parts of the bases can be restrained when, for example, a large strain is occurred in the measuring object. As a result, a range of measurable strain amount can be widened in comparison with the conventional art. Further, the strain occurred in the measuring object can be transmitted to the optical fiber without being impeded by the bases so that the strain occurred in the measuring object can be accurately measured even when the measuring object has rigidity smaller than the base.

In this strain sensor, a configuration in which the connecting member has a spacer to hold an interval between the first base and the second base at a predetermined interval can be employed. A configuration in which the connecting member is caught between the first base and the second base by the tension applied to the optical fiber can be also employed.

In the above strain sensor, a configuration in which the optical fiber has a FBG (fiber Bragg grating) between a fixation and support position of the first base and a fixation and support position of the second base can be employed. A configuration in which the first base or the second base has a support around which the optical fiber is wound can be also employed.

On the other hand, in another aspect, the present invention can provides a method for installing a strain sensor as well. Namely, in a method for installing the strain sensor, firstly, a first base and a second base of the above-described strain sensor are fixed on a surface of a measuring object. Next, a connecting member is detached from the fixed strain sensor so that the first base and the second base are separated.

Effects of Invention

According to the present invention, the range of the measurable strain amount can be widened in comparison with the conventional art. In addition, even though the measuring object has low rigidity, the strain thereof can be more accurately measured.

BRIEF DESCRIPTION OF DRAWINGS

FIGS. 1 (a) to (c) are schematic structural views showing an example of the strain sensor in accordance with an embodiment of the present invention.

FIGS. 2 (a) to (d) are schematic cross-sectional views showing an example of the strain sensor in accordance with an embodiment of the present invention.

FIGS. 4 (a) to (c) are illustrations showing a separating procedure of the strain sensor in accordance with an embodiment of the present invention.

FIGS. 6 (a) to (c) are schematic structural views showing the other example of the strain sensor in accordance with an embodiment of the present invention.

DESCRIPTION OF EMBODIMENTS

Embodiments of the present invention are described in detail hereafter with reference to the drawings. Hereafter, the present invention is embodied as a single-axis strain sensor (a strain gage).

Figure 1:
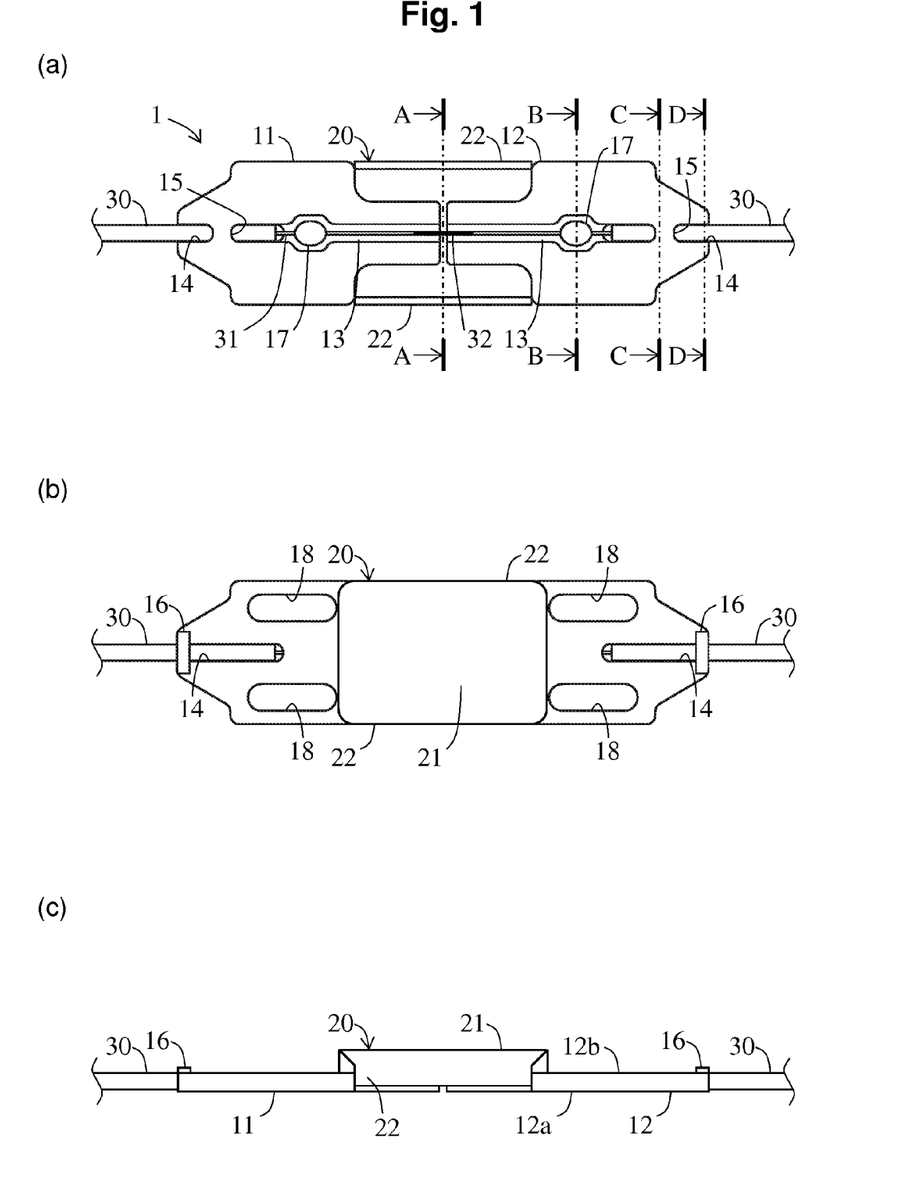
Figure 2:
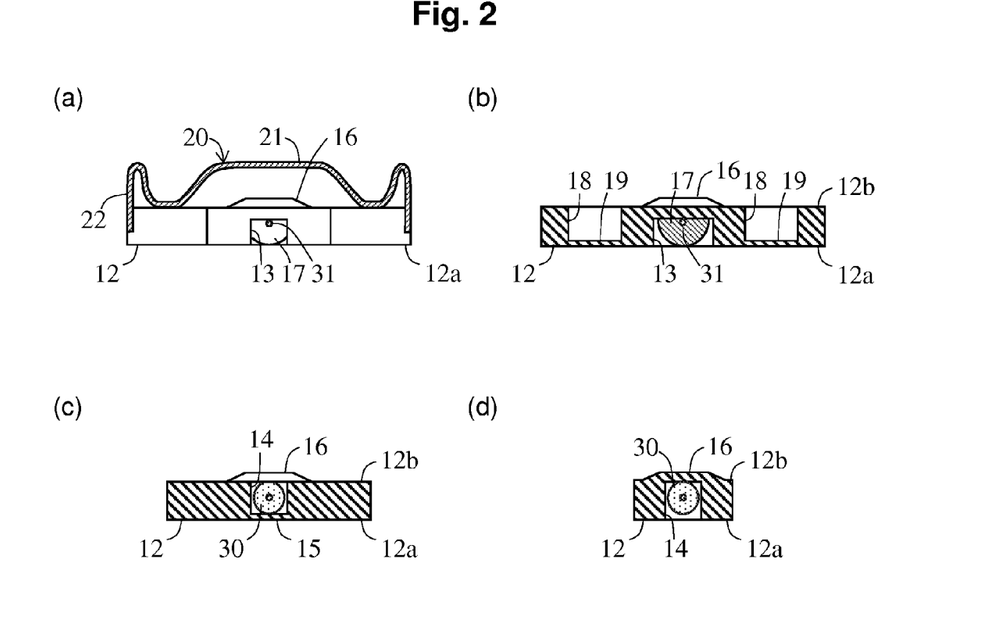

FIGS. 1 (a) to (c) are schematic structural views showing an example of a whole configuration of a strain sensor in accordance with this embodiment. FIG. 1 (a) shows a surface to be fixed to a surface of a measuring object (hereafter, referred to as an abutment surface). FIG. 1 (b) shows an opposite surface to the surface shown in FIG. 1 (a) (hereafter, referred to as an exposed surface). FIG. 1 (c) is a side view. FIGS. 2 (a) to (d) are schematic cross-sectional views taken along a line A-A, a line B-B, a line C-C and a line D-D shown in FIG. 1 (a). In FIGS. 2 (a) to (d), the abutment surface is arranged at lower side of the drawings and the exposed surface is arranged at upper side of the drawings. Then, FIGS. 2 (a) to (c) are the schematic views so that a measurement of each part is not precisely shown. Also, a scale of FIGS. 1 (a) to (c) is different from that of FIGS. 2 (a) to (d).

As shown in FIGS. 1 (a) to (c) and FIGS. 2 (a) to (d), a strain sensor 1 is provided with bases 11 and 12, a connecting member 20 and an optical fiber 30. The base 11 (a first base) fixes and supports one side of the optical fiber 30. The base 12 (a second base) fixes and supports another side of the optical fiber 30. In the strain sensor 1, the optical fiber 30 is arranged to direct to one direction in the same plane. Then, it is not especially limited, but according to this embodiment the optical fiber 30 has a configuration in which a core which propagates light, a cladding which surrounds the core and reflects light propagating in the core to a core side, and a resin jacket which surrounds the cladding and protects the core and the cladding are arranged in this order from a center.

In this embodiment, the bases 11 and 12 have the same configurations and are arranged in a positional relationship of a line symmetry holding a given interval between the bases 11 and 12. In the bases 11 and 12, along a given length in a direction in which the optical fiber is arranged (hereafter, referred to as a longitudinal direction) from side ends where the bases 11 and 12 face each other, a width of a perpendicular direction to the longitudinal direction (hereafter, referred to as a short-length direction) becomes narrow. Hereafter, a narrow-width part in the short-length direction is referred to as a narrow part and a wide-width part adjacent to the narrow part in the short-length direction is referred to as a wide part. Hereafter, the configurations of the bases 11 and 12 are described on the basis of the configuration of the base 12.

As shown in FIGS. 1 (a) to (c), FIG. 2 (c) and FIG. 2 (d), the base 12 in this embodiment is constituted of a plate member having a thickness thicker than a diameter of the optical fiber 30. The base 12 is provided with a recessed part 13 and a groove 14 arranged along the longitudinal direction. The recessed part 13 and the groove 14 are arranged on the same straight line. The recessed part 13 is formed from one end of the base 12 toward a center part and the groove 14 is formed from another end of the base 12 toward the center part. The optical fiber 30 containing the core, the cladding and the resin jacket is arranged in the groove 14, and the optical fiber 30 exposing the core (hereafter, referred to as a core 31) in which the resin jacket and the cladding are removed is arranged in the recessed part 13. Further, as shown in FIG. 1 (*a*), the core 31 is arranged in the interval between the recessed part 13 of the base 11 and the recessed part 13 of the base 12.

The groove 14 is formed penetrating in a thickness direction of the base 12 and a part of the groove 14 is connected by connection beams 15 and 16. As shown in FIG. 1 (*a*) and FIG. 2 (*c*), the connection beam 15 is arranged in a middle part of the groove 14 on the abutment surface 12*a* side. As shown in FIG. 1 (*b*) and FIG. 2 (*d*), the connection beam 16 is arranged at an end of an opening end side of the groove 14 on the exposed surface 12*b* side. As shown in FIG. 1 (*c*), the abutment surface 12*a* of the base 12 is constituted of a flat surface. Material of the base 12 is not especially limited. For example, the material may be resin or metal. Herein, the base 12 is made of stainless steel.

As shown in FIG. 2 (*a*) and FIG. 2 (*b*), the recessed part 13 has a bottom surface with which the core 31 capable of being in contact in a state of not adding stress in a thickness direction of the base 12. Namely, in this example, the recessed part 13 is formed in an equal depth (or almost an equal depth) of a sum total of a thickness of the resin jacket, a thickness of the cladding and a diameter of the core. In viewpoint of enhancing measurement accuracy, the core 31 is preferably arranged parallel to a surface of a measuring object. Therefore, in this embodiment, the bottom surface of the recessed part 13 is constituted of a parallel surface to the abutment surface 12*a*.

In the core 31 arranged at the interval between the recessed part 13 of the base 11 and the recessed part 13 of the base 12, a FGB (fiber Bragg grating) 32 having specific Bragg wavelength is arranged. In the drawings the FBG 32 is shown in black for convenience'sake.

As known, the FBG reflects light whose wavelength regulated by the Bragg wavelength. The FBG is formed by a plurality of diffraction gratings installed at a given interval in the core of the optical fiber and the Bragg wavelength is proportional to a product of a reflective index of the optical fiber and the interval between the diffraction gratings. Therefore, the FBG is stretched by strain so that the interval between the diffraction gratings forming the FBG extends, thereby the optical wavelength reflected by the FBG becomes larger. While, the FBG is compressed by strain so that the interval between the diffraction gratings forming the FBG narrows, thereby the optical wavelength reflected by the FBG becomes smaller. Also, when a plurality of the strain sensors 1 is used in connecting in series, the Bragg wavelength of each strain sensor 1 is set different each other. Thereby, reflecting positions of reflected light are easily distinguished on the basis of the wavelengths of the reflected light.

Next, a connecting member 20 is explained. The connecting member 20 is constituted of a separate member from the bases 11 and 12 and is detachably mounted between the bases 11 and 12. In this example, as shown in FIGS. 1 (*a*) to (*c*), the connecting member 20 has a structure in which spacers 22 are integrally connected with a rectangular plate-like part 21 in planar view. Herein, the spacers 22 are arranged over the narrow part of the base 11 and the narrow part of the base 12. The spacers 22 function as spacers to hold the interval between the base 11 and the base 12 at a predetermined interval. Further, as shown in FIG. 1 (*c*), a length of the plate-like part 21 in a longitudinal direction is longer than that of the spacers 22 in a longitudinal direction, and parts of the plate-like part 21 are arranged on the wide parts of the bases 11 and 12. Then, it is not especially limited, but in this example the spacers 22 are arranged in outer edges of the bases 11 and 12, and the connecting member 20 is designed so that side surfaces of the bases 11 and 12 and side surfaces of the connection member 20 (the spacers 22) become flat.

Tension (pretension) is applied to the optical fiber 30 in a state in which the connecting member 20 is mounted (arranged) between the base 11 and the base 12, and in the state in which the tension is applied the connecting member 20 is fixed to the base 11 and the base 12 respectively. The tension is applied in this manner, thereby the strain sensor 1 can detect stress in a compressive direction as well as in a tensile direction.

As shown in FIG. 1 (*a*), the recessed parts 13 have wide areas in the short-length direction adjacent to connected portions of the recessed parts 13 and the grooves 14. In these areas, the core 31 is fixed on the bottoms of the recessed parts 13 by fixing materials 17. A material of the fixing materials 17 is not especially limited, as long as the fixing materials 17 are capable of fixing the core (the optical fiber 30) to the bases 11 and 12 in the state in which the tension is applied. Here, an adhesive is used for the fixing materials 17.

Any known method like an adhesive, spot welding and the like can be employed in order to fix the strain sensor 1 on the measuring object. As described above, the strain sensor 1 is made of stainless steel. Thus, when a surface of the measuring object is metal, the strain sensor 1 can be fixed by the spot welding. Then, the strain sensor 1 in this embodiment has recessed parts 18 used for the spot welding. As shown in FIG. 1 (*b*) and FIG. 2 (*b*), the recessed parts 18 are formed on the exposed surface 12*b*. The recessed parts 18 are formed at both sides of the optical fiber 30 along the longitudinal direction and the bottoms 19 of the recessed parts 18 constitute of thin parts for the spot welding.

When the strain sensor 1 is fixed to the measuring object by the spot welding, the strain sensor 1 is arranged in a state in which the abutment surface 12*a* faces the measuring object. Then, in a state in which the thin parts of the bottoms 19 of the recessed parts 18 are made contact with the measuring object, the thin parts are spot welded with a surface of the measuring object Next, an assembly procedure of the strain sensor 1 is explained. First, the spacers 22 of the connecting member 20 are arranged between the wide part of the base 11 and the wide part of the base 12 (refer to FIGS. 1 (*a*) to (*c*)). As described above, the optical fiber 30 is fixed to and supported by the bases 11 and 12 respectively in the state in which the tension is applied. Therefore, the optical fiber is fixed to the bases 11 and 12 so that the spaces 22 are caught between the base 11 and the base 12 by tension applied by the optical fiber 30, thereby the connecting member 20 is not released from the base 11 and the base 12. However, until the optical fiber 30 is fixed to and supported by the bases 11 and 12, the spacers 22 are not caught between the base 11 and the base 12 so that the connecting member 20 is easily released. Accordingly, until the optical fiber 30 is fixed to and supported by the bases 11 and 12, the connecting member 20 is temporarily fixed to the bases 11 and 12 with an adhesive tape and the like, or the bases 11 and 12 and the connecting member 20 are hold not to be separated by using dedicated tools and the like preferably.

The optical fiber 30 is arranged in a state in which the spacers 22 of the connecting member 20 are mounted between the base 11 and 12. At this time, one end side of the optical fiber 30 (for example, at the base 11 side) is temporarily fixed by a clamp and the like. In this state, another end side of the optical fiber 30 is inserted in the groove 14 of the base 11 and successively in the groove 14 of the base 12. At this time, the optical fiber 30 is inserted from an end side of the base 11 to the groove 14 in the base 11. Also, the optical fiber 30 is inserted from a center side of the base 12 to the groove 14 in the base 12. Also, at this time, a position of the optical fiber 30 is adjusted in a state of releasing fixation by the clamp and the like so that the FBG 32 of the core 31 can be positioned on an interval between the base 11 and the base 12. After adjustment, the one end of the optical fiber 30 is fixed again by the clamp and the like. In the optical fiber 30, a part of the core 31 arranged in the recessed part 13 is preliminary exposed and the FBG 32 is preliminary formed in a center part in an axis direction of the exposed core 31.

In this state, tension is applied to the optical fiber 30 (the core 31). According to the assembly procedure in this embodiment, tension is applied by pulling the another end of the optical fiber 30. Then, the optical fiber 30 is fixed to the bases 11 and 12 respectively with the fixing materials 17 in a state in which the tension is applied. After completion of the fixation with the fixing materials 17, the another end of the optical fiber 30 is stopped pulling and released from the temporarily fixation by the clamp and the like. As described above, the optical fiber 30 is fixed to the bases 11 and 12 respectively with the fixing materials 17, thereby the spacers 22 of the connecting member 20 are caught between each of the bases 11 and 12. As a result, even the above-described temporary fixation and the like is released, the connecting member 20 is not released as long as external force is not given.

Figure 3:
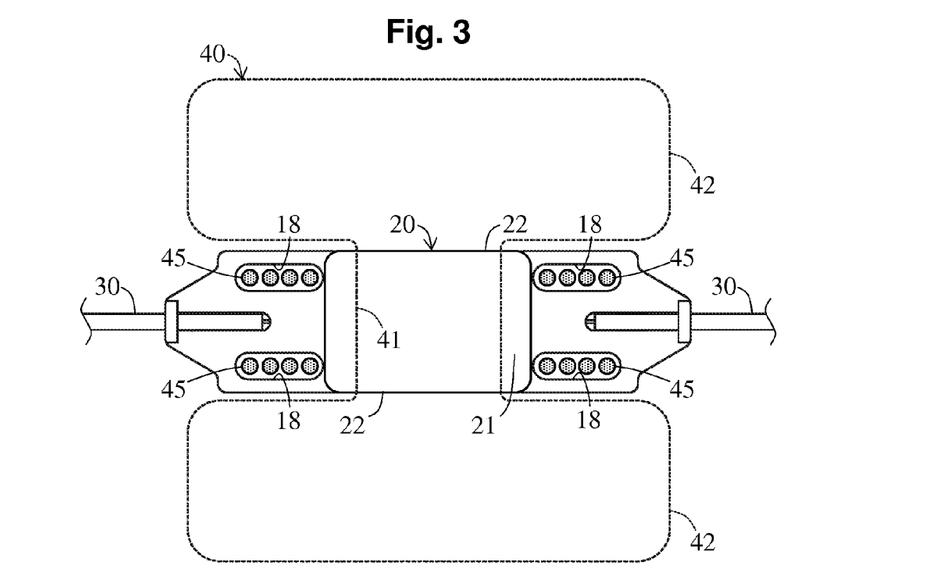
FIG. 3 is a schematic structural view showing an example of an installation state of the strain sensor in accordance with an embodiment of the present invention.

When the strain sensor 1 having the above-described structure is fixed to the measuring object, the external force is added to the connecting member 20 by mistake while working, thereby the connecting member 20 may be released. Thus, the strain sensor 1 in this embodiment is provided with a temporary fixing member to temporarily fix the strain sensor 1 to the measuring object. FIG. 3 shows a strain sensor 1 provided with an adhesive tape as the temporary fixing member.

As shown in FIG. 3, an adhesive tape 40 in planar view is provided with a base part 41 which has a smaller external form than that of the plate-like part 21 and a temporary fixing part 42 which passes from the base part 41 through the spacers 22 and protrudes outward of the strain sensor 1. The base part 41 is attached on the plate-like part 21 of the connecting member 20. In FIG. 3, the adhesive tape 40 is shown by a dotted line for illustration.

When the strain sensor 1 is fixed to the measuring object, a worker temporarily fixes the strain sensor 1 on the surface of the measuring object with the temporary fixing part 42. Then, in this state the strain sensor 1 is spot welded on the measuring object by using the recessed part 18. In FIG. 3, spot welded parts 45 are shown in half-tone dot meshed.

After completion of the spot welding, the connecting member 20 is released so that the base 11 and the base 12 in the strain sensor 1 are separated. As described above, since the connecting member 20 is just caught by the base 11 and the base 12 respectively, the connecting member 20 can be easily released by relatively small external force.

Figure 4:
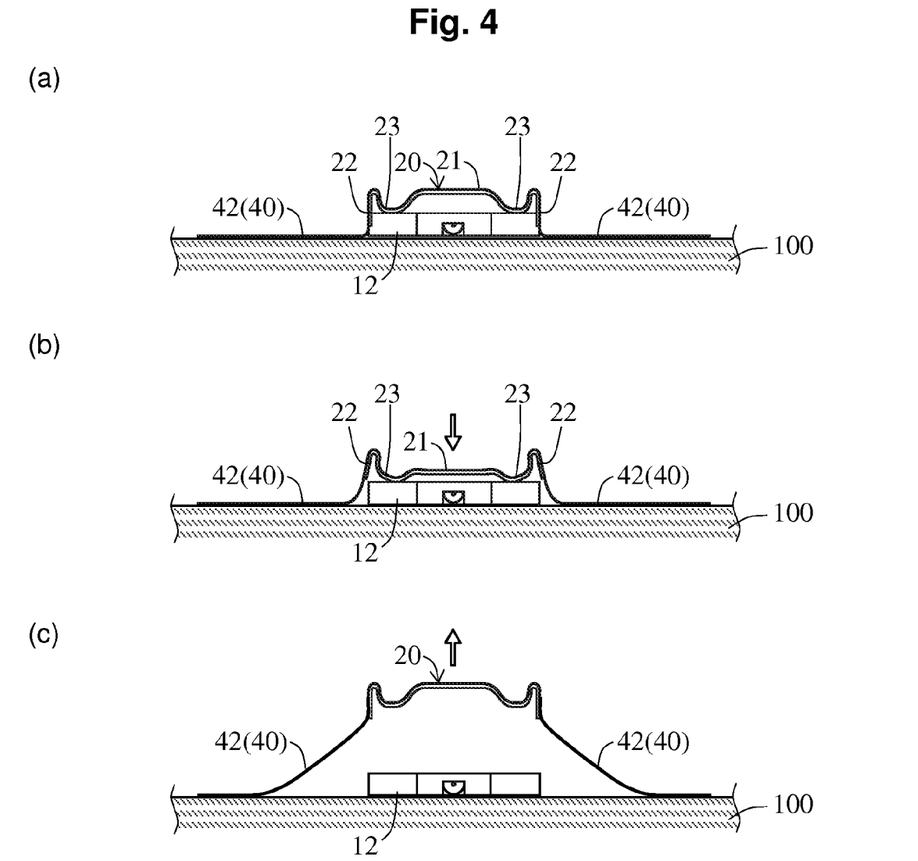

It is not especially limited, but, according to a configuration employed in this embodiment, the plate-like part 21 of the connecting member 20 is a plate spring so that the connecting member 20 is released by pressing the plate-like part 21 toward a direction of the measuring object. FIGS. 4 (a) to (c) are schematic views showing a releasing procedure of the connecting member 20. FIGS. 4 (a) to (c) show cross sections taken along a line A-A indicated in FIG. 1 (a).

FIG. 4 (a) shows the strain sensor 1 fixed to a measuring object 100. As shown in FIG. 4 (a), the plate-like part 21 has an abutment part 23 abutting to the bases 11 and 12 adjacent to the spacers 22, while a center part of the plate-like part 21 is rising from the bases 11 and 12. As shown FIG. 1 (c), a length of the plate-like part 21 in the longitudinal direction is longer than those of spacers 22 in the longitudinal direction and a part of the plate-like part 21 is arranged on the wide parts of the bases 11 and 12. Therefore, both end parts of the abutment part 23 in the longitudinal direction abut to the wide part of the base 11 and the wide part of the base 12.

In this state, when the center part of the plate-like part 21 is pressed toward the measuring object 100, accompanied by pressing, the spacers 22 are lifted to a direction away from the measuring object 100 (FIG. 4 (b)). Thereby, the connecting member 20 is released from the bases 11 and 12.

After that, as shown in FIG. 4 (c), the connecting member 20 is lifted to the direction away from the measuring object 100 so that the adhesive tape 40 is peeled off the measuring object 100, thereby the connecting member 20 can be completely released.

Figure 5:
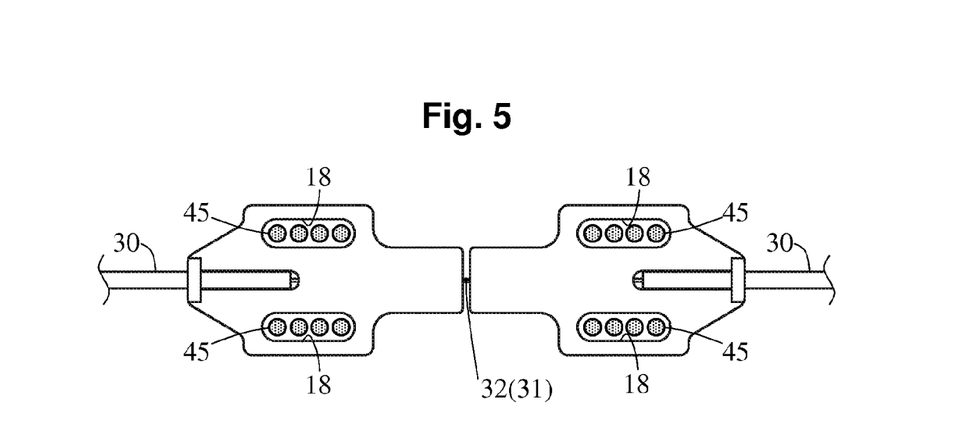
FIG. 5 is a schematic view showing an installation state of the strain sensor in accordance with an embodiment of the present invention.

As shown in FIG. 5, the connection member 20 is released in that way, the bases 11 and 12 are independent respectively so as not to be affected by another base. For example, when large strain is generated in the measuring object, according to a configuration employing a single-structured base provided with an elastic part like a support bar or a narrow part, a range of measurable strain amount is limited to a range the elastic part can follow. Namely, when a large strain exceeding deformation limit of the elastic part (permissible strain amount) is generated, stress is concentrated in one part of the base so that it becomes difficult to accurately transmit the strain to the FBG. On the other hand, in a configuration in which the each of the base 11 and 12 is separated, the bases 11 and 12 are deformed more largely than the single-structured base. Therefore, in comparison with the conventional art, the range of strain amount which can be measured can be expanded.

Also, the bases 11 and 12 are independent respectively so that the strain generated in the measuring object can be transmitted to the FBG 32 of the optical fiber 30 without interference of the bases. Therefore, for example, as the measuring object is a thin plate member, even if the measuring object has rigidity smaller than the bases 11 and 12, the strain generated in the measuring object can be accurately measured.

Further, in the strain sensor 1 the connecting member 20 is pressed toward the measuring object, thereby each of the bases 11 and 12 can be separated. Accordingly, when the connecting member 20 is released, force applied in a direction of peeling off hardly acts on the bases 11 and 12 fixed to the measuring object. Therefore, in releasing the connecting member 20, stress which diminishes an abutment force can be restrained from being added at spot welded portions 45 as well.

As described above, in the strain sensor 1, for example, when the large strain is generated in the measuring object, concentration of stress on a specific portion can be prevented and the range of the measurable strain amount is expanded in comparison with the conventional art. Also, even the measuring object has low rigidity, the strain can be accurately measured.

Figure 6:
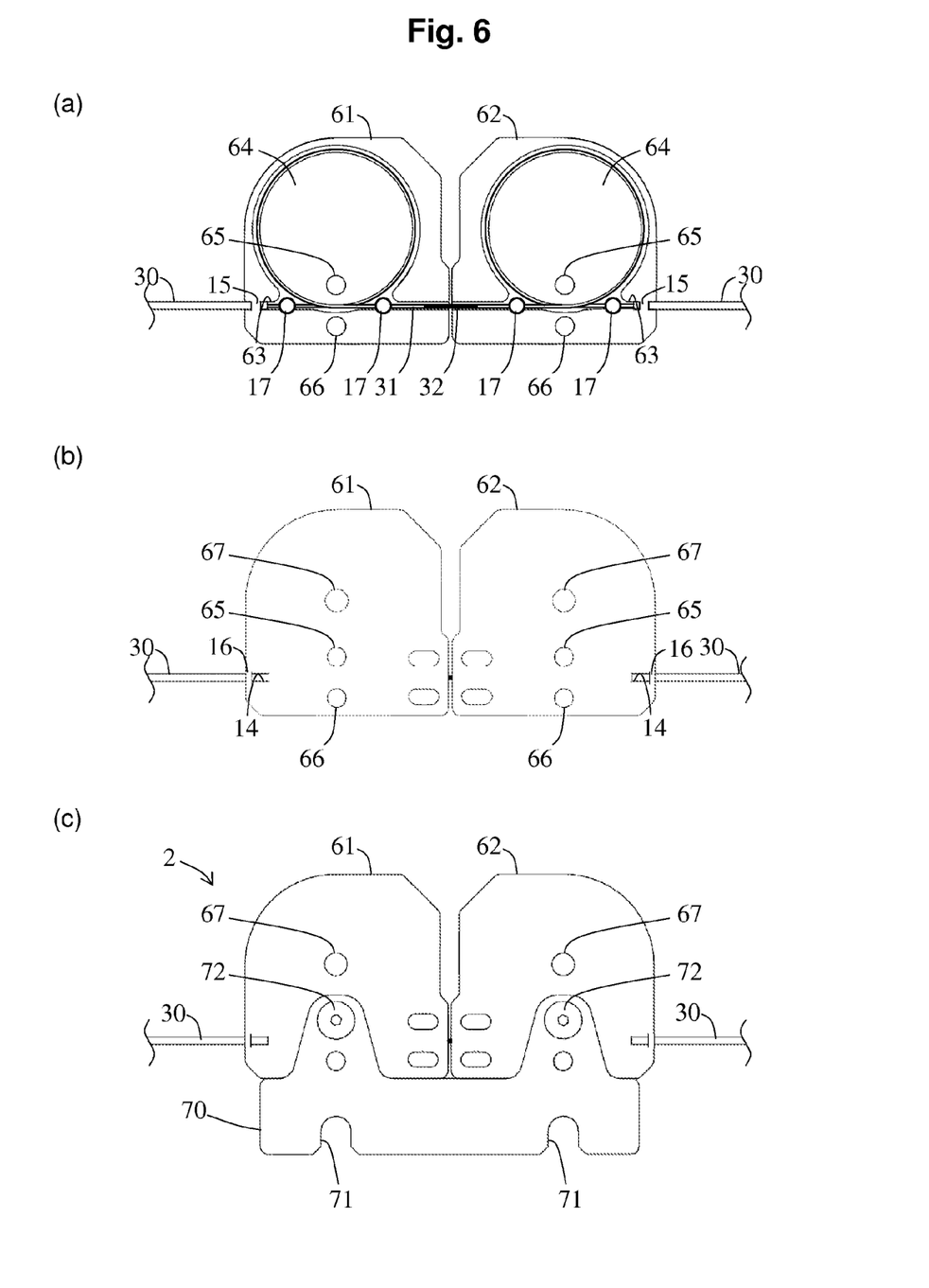

FIGS. 6 (a) to (c) are schematic structural views showing an example of a whole configuration of another strain sensor according to this embodiment. FIG. 6 (a) shows a surface fixed to a surface of a measuring object (an abutment surface). FIG. 6 (b) shows an opposite surface to FIG. 6 (a) (an exposed surface). FIG. 6 (a) and FIG. 6 (b) show a state in which a connecting member is released and each of bases is separated. FIG. 6 (c) shows a state in which each base is connected by a connecting member. Also, in FIGS. 6 (a) to (c), the same reference signs are used for components having the same effect as those described above.

As shown in FIGS. 6 (a) to (c), the strain sensor 2 is provided with bases 61 and 62, a connecting member 70 and an optical fiber 30. The base 61 (a first base) fixes and supports one side of the optical fiber 30. Then, the base 62 (a second base) fixes and supports another side of the optical fiber 30.

As shown in FIG. 6 (a), the bases 61 and 62 have supports 64 around which the optical fiber 30 (herein, the optical fiber 30 exposing a core 31) is wound. In this example, the supports 64 are constituted of the recessed parts 63 in the bases 61 and 62. Namely, the recessed parts 63 have circular portions being in contact with linear portions in addition to linear portions shown in FIG. 1 (a). Portions surrounded by the circular portions of the recessed parts 63 (convex portions) constitute supports 64. It is not especially limited, but herein, as shown in FIG. 6 (a), both ends of the core 31 wound around the supports 64 are fixed to bottoms of the recessed parts 63 by using fixing materials 17 in the linear portions of the recessed parts 63. Also, in the same manner as the strain sensor 1 shown in FIG. 1 (a), the core 31 (the optical fiber 30) is fixed to the bases 61 and 62 in a state in which tension is applied.

In this way, a configuration in which the core 31 (the optical fiber 30) is wound around the supports 64 is employed, even when the strain sensor 2 is used under severe environment such as for an outer wall of a building structure and the like, so that occurrence of sliding of the core 31 (the optical fiber 30) against the bases 61 and 62 caused by tension can be restrained, thereby long-term reliability of the strain sensor 2 can be enhanced.

In the same manner as the strain sensor 1, the bases 61 and 62 are connected to the connecting member 70 in a state of holding a predetermined interval. The FBG 32 is arranged on the interval. As shown in FIG. 6 (a) and FIG. 6 (b), the support 64 of each base 61 and 62 has a screw hole 65 adjacent to the linear portion of the recessed part 63. Further, a fitting hole 66 is formed at opposite side of the screw hole 65 across the linear portion of the recessed part 63. On the other hand, in the connecting member 70 pins fitting to the fitting holes 66 are provided at positions corresponding to the fitting holes 66 and through holes are provided at positions corresponding to the screw holes 65. As shown in FIG. 6 (c), in a state in which the pins are fitted to the fitting holes 66, screws 72 are screwed in the screw holes 65 of each of the base 61 and 62 through the through holes, thereby each of the bases 61 and 62 is connected with the connecting member 70. In this example, the connecting member 70 is constituted of a plate material having pins fitting to the fitting holes 66 on a surface abutting to the bases 61 and 62, however, on the surface abutting to the bases 61 and 62 not only the pin but also concave portions or convex portions can be formed in order to match positions with the bases 61 and 62

In this example, the bases 61 and 62 are made of stainless steel, and as shown in FIG. 6 (b) and FIG. 6 (c) the bases 61 and 62 have recessed parts 67 for spot welding on the exposed surfaces. The recessed parts 67 are formed in centers of the supports 64 and bottom parts of the recessed parts 67 constitute thin parts for the spot welding.

When the strain sensor 2 is fixed to the measuring object by the spot welding, the strain sensor 2 is arranged in a state in which the abutment surface faces the measuring object. Then, in a state in which the thin parts of the bottom parts of the recessed parts 67 are made in contact with the surface of the measuring object, the thin parts and the surface of the measuring object are spot welded. As shown in FIG. 6 (c), the connecting member 70 has a form covering around the screw holes 65 and the fitting holes 66, and the recessed parts 67 are exposed. Thereby, in a state in which the bases 11 and 12 are connected to the connecting member 70, the spot welding is performed.

Also, the connecting member 70 has notches 71 in an outer periphery which can be used for temporary fixation of the strain sensor 2 to the measuring object prior to spot welding or fixation of the strain sensor 2 during adhesion with the adhesive.

After completion of the fixation of the strain sensor 2 to the measuring object, the screws 72 are removed and the connecting member 70 is released, thereby each of the bases 11 and 12 can be separated. In this way, even the strain sensor 2 in which the connecting member and island-shaped members are connected by using coupling members as screws and the like, the same effect as the strain sensor 1 can be obtained.

The above-described embodiments do not restrict the technical scope of the present invention, and in addition to the above, various modifications and applications within the scope of the present invention are possible. For example, in the above embodiment, the configuration to detect strain by the variations of the wavelengths of the reflected light in the FBG 32 is described as the especially preferable embodiment, however, means for detecting the strain is not especially limited. Although a size of the sensor may be larger, for example, as strain is detected by measuring the variations of the back scattering light of the optical fiber, a distribution type of detection of strain can be employed.

In addition, in the above embodiment, as the especially preferable embodiment, the configuration in which the FBGs 32 having different wavelengths each other are arranged to detect strain by WDM (wavelength division multiplexing) system is described, however, the present invention is applicable for a configuration in which the FBGs 32 having equal wavelength to detect the strain by TDM (time division multiplexing) system. In TDM system, intervals between adjacent FBGs should be more than a few meters, but this system is adaptable by increasing the number of turns which the optical fiber is wound around the supports 64.

Also, the strain sensors having two bases are described in the above, however, the number of divisions of the base is not especially limited and any number of divisions can be employed. Further, in the above-described embodiment, examples of a single axis strain sensor applied to the present invention is described, however, a rosette strain sensor detecting strain amount and a strain direction can be applied to the present invention. In this case, cores provided with FBGs are arranged to direct to different directions, however, for example, the present invention is applied to a plurality of bases respectively containing a position for fixing and supporting a core.

Furthermore, in the above described embodiment, the connecting member is constituted of one member, however, a connecting member divided by every spacer is not excluded. In addition, it is not limited to configurations in which the connecting member is caught by the bases or is connected with screws, but any configuration capable of holding a predetermined interval between each base can be employed. Also, material of the connecting member is not especially limited. For example, metal or resin may be used.

INDUSTRIAL APPLICABILITY OF INVENTION

According to the present invention, the range of the measurable strain amount can be more expanded than the conventional art, and even strain of the measuring object having low rigidity is accurately measured so that the present invention is useful as the strain sensor and the method for installing the strain sensor.

EXPLANATION OF REFERENCE SIGNS 1, 2 strain sensor
11, 61 base (first base)
12, 62 base (second base)
13, 63 recessed part
14 groove
15, 16 connection beam
17 fixing material
18 recessed part
20 connecting member
21 plate-like part (connecting member)
22 spacer (connecting member)
23 abutment surface (connecting member)
30 optical fiber
31 core (optical fiber)
32 FBG (optical fiber)
40 adhesive tape (temporary fixing member)
41 base part (temporary fixing member)
42 temporary fixing part (temporary fixing member)
70 connecting member

The invention claimed is:

1. A strain sensor provided with an optical fiber, comprising:
   a first base fixing and supporting one side of the optical fiber, the first base being a plate member and having a recessed part in which the optical fiber is arranged;
   a second base fixing and supporting another side of the optical fiber, the second base being a plate member and having a recessed part in which the optical fiber is arranged;
   a connecting member that is separate and distinct from the first base and the second base, the connecting member being detachably mounted between the first base and the second base; and
   the optical fiber to which tension is applied in a state in which the connecting member is mounted between the first base and the second base, the optical fiber being fixed to and supported by the first base and the second base respectively in a state in which the tension is applied.

2. The strain sensor according to claim 1, wherein the connecting member is provided with a spacer to hold an interval between the first base and the second base at a predetermined interval.

3. The strain sensor according to claim 2, wherein the connecting member is caught between the first base and the second base by tension applied to the optical fiber.

4. The strain sensor according to claim 3, wherein the first base or the second base is provided with a support around which the optical fiber is wound.

5. The strain sensor according to claim 2, wherein the optical fiber is provided with a FBG (fiber Bragg grating) between a fixation and support position of the first base and a fixation and support position of the second base.

6. The strain sensor according to claim 2, wherein the first base or the second base is provided with a support around which the optical fiber is wound.

7. The strain sensor according to claim 2, wherein the connecting member is provided with a plate-like part being a plate spring, the plate-like part being integrally connected with the spacer caught between the first base and the second base.

8. The strain sensor according to claim 1, wherein the connecting member is caught between the first base and the second base by tension applied to the optical fiber.

9. The strain sensor according to claim 8, wherein the optical fiber is provided with a FBG (fiber Bragg grating) between a fixation and support position of the first base and a fixation and support position of the second base.

10. The strain sensor according to claim 8, wherein the first base or the second base is provided with a support around which the optical fiber is wound.

11. The strain sensor according to claim 1, wherein the optical fiber is provided with a FBG (fiber Bragg grating) between a fixation and support position of the first base and a fixation and support position of the second base.

12. The strain sensor according to claim 1, wherein the first base or the second base is provided with a support around which the optical fiber is wound.

13. A method for installing a strain sensor, comprising the steps of:
   fixing the first base and the second base of the strain sensor according to claim 1 on a surface of a measuring object; and
   separating the first base from the second base by detaching the connecting member from the fixed strain sensor.

14. The strain sensor according to claim 1, wherein the recessed part is formed on an abutment surface to be fixed to the measuring object in the first base and the second base.

* * * * *